No. 879,216. PATENTED FEB. 18, 1908.
L. THIEL.
VARIABLE SPEED MECHANISM.
APPLICATION FILED SEPT. 16, 1907.
2 SHEETS—SHEET 1.
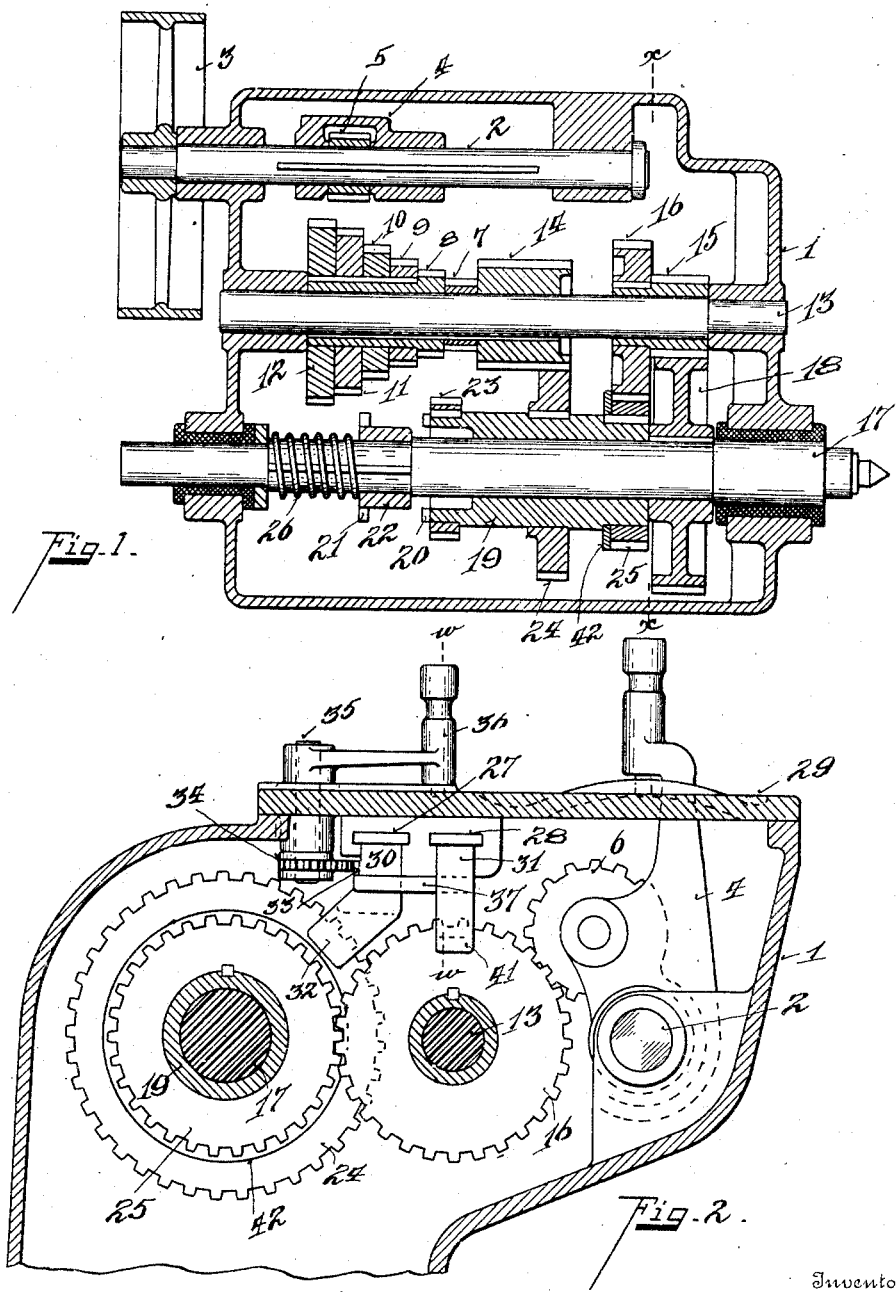

No. 879,216.　　　　　　　　　　　　　　PATENTED FEB. 18, 1908.
L. THIEL.
VARIABLE SPEED MECHANISM.
APPLICATION FILED SEPT. 16, 1907.
2 SHEETS—SHEET 2.
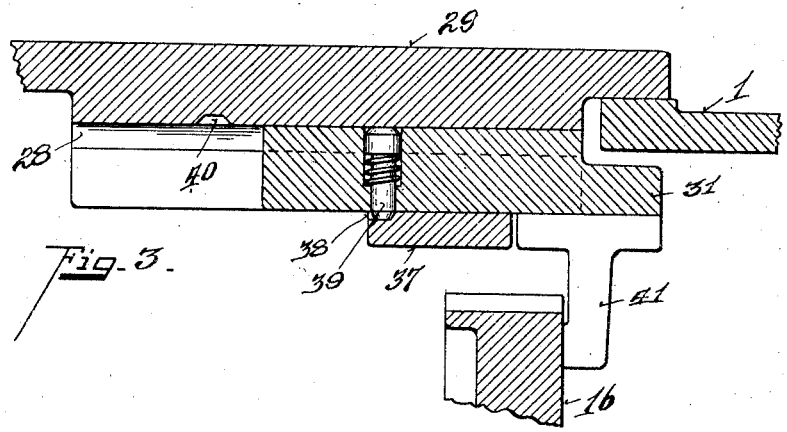
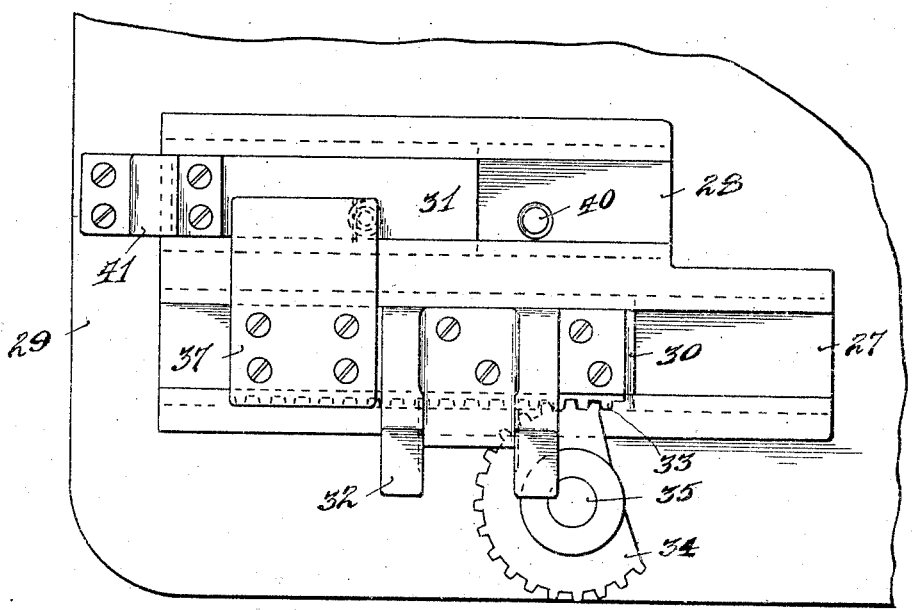

UNITED STATES PATENT OFFICE.

LOUIS THIEL, OF CINCINNATI, OHIO.

VARIABLE-SPEED MECHANISM.

No. 879,216.      Specification of Letters Patent.      Patented Feb. 18, 1908.

Application filed September 16, 1907. Serial No. 393,032.

*To all whom it may concern:*

Be it known that I, LOUIS THIEL, a citizen of the United States, residing at Cincinnati, in the county of Hamilton and State of Ohio, have invented certain new and useful Improvements in Variable-Speed Mechanism, of which the following is a specification.

My invention relates to a system of slidable gears for producing varying speeds.

One of the objects of my invention is to provide a series of gears loose and slidably mounted upon their shafts adapted to be brought into selected engagement with gears on the opposing shaft and into driving engagement serving as transmitters when in one position, and idle when in a released position.

Another object of my invention is to provide an arrangement of sliding gears upon two shafts controlled by one lever in which the gears on one shaft are positively shifted by the movement of the shifting lever, and the gears on the second shaft are intermittently shifted.

Other features of my invention will be more fully set forth in the description of the accompanying drawings forming a part of this specification, in which:—

Figure 1 is a horizontal section through my improved system of gearing. Fig. 2 is a section on line x, x, Fig. 1. Fig. 3 is a section on line w, w, Fig. 2. Fig. 4 is a bottom plan view of the shifting mechanism.

1 represents the frame for supporting my improved varying speed system of gearing.

2 represents the main driving shaft suitably journaled within the frame 1.

3 represents a driving pulley fixed to the shaft 2 for transmitting motion thereto. Upon the said shaft 2 is mounted a sliding tumbler frame 4 carrying a gear 5 splined upon said shaft 2, and the intermediate gear 6 in mesh with gear 5 and movable with the tumbler frame 4. Said intermediate gear being adapted to be thrown into engagement with any one of the gears 7, 8, 9, 10, 11 and 12 forming a cone fixed to shaft 13 journaled in the frame 1. This shaft 13 for convenience I will term the first shaft.

14 represents an elongated gear keyed to the shaft 13, and 15 represents a gear loose upon shaft 13 one end having a sleeve projection upon which a gear 16 is fixed.

17 represents a spindle or shaft which for convenience I will term the second shaft, suitably journaled within the frame 1.

18 represents a gear fixed upon the shaft 17. Gear 15 on shaft 13 being adapted to be slid into mesh with the gear 18.

The mechanism for shifting will be hereinafter described.

19 represents a sleeve slidably mounted upon the shaft 17, one end of said sleeve being provided with clutch teeth 20 adapted to be thrown into engagement with the clutch teeth 21 of the sleeve 22, said sleeve being splined and keyed upon the shaft 17.

23, 24 and 25 represent different diameter gear wheels fixed upon the sleeve 19, and suitably spaced from each other in order to enable the proper intermesh with the respective gears upon shaft 13, for producing the various ranges of speed possible with the system of gearing.

26 represents a spring one end of which bears against the sleeve 22, the opposite end against the frame 1 for exerting pressure against the sleeve 22 for automatically moving the same to its normal position, the position shown in Fig. 1. The sleeve 19 at its clutching end is bored out to receive the sleeve 22. Gear 25 is adapted to mesh with gear 16, gear 24 with gear 14 and gear 23 with gear 12. When the sliding gears on shaft 17 are in the position shown in Fig. 1 they serve as intermediates and when gear 15 is disengaged from gear 18 the sleeve 19 will be thrown into engagement with the sleeve 22 clutching the sleeve 19 to the shaft 17 in which instance the gears 23, 24, when intermeshed with their respective gears on shaft 13 serve as drivers to the shaft 17.

It is very desirable to accomplish the shifting of the sliding gears on shaft 13 and 17 by one lever, which is accomplished as follows:—27, 28, represent ways formed on the cover plate 29 of the frame 1, within which ways the slide plates 30, 31, slide. 32 represents a fork fixed to the slide plate 30 adapted to straddle the gear 24. Thus as the slide plate is moved to the right or left it will move the sleeve 19 with its gears. 33 represents rack-teeth formed on the side plate 30. 34 represents a segment provided with teeth intermeshed with the rack-teeth 33. 35 represents a shaft upon which the segment 34 is fixed at one end, and 36 represents a hand lever operating said segment 34 for shifting the slide plate 30.

In the arrangement shown in the drawings it is only desirable to shift gears 15 and 16 a sufficient distance to throw gear 15 out of mesh with gear 18 and then come to rest remaining stationary and locked in such position after the shift while the gears on sleeve 19 are shifted further to the left. This movement is controlled by the following instrumentalities, (see Figs. 3 and 4.)

37 represents a plate fixed to the slide plate 30 and projected laterally therefrom to overlap the slide plate 31. Said plate 37 is provided with a notch 38 adapted to receive the spring controlled detent 39 mounted in the slide plate 31.

40 represents a notch formed in the guide way 38 adapted to receive the opposite end of the detent 39 after the slide plate has been moved a sufficient distance to disengage the gear 15 from the gear 18. Thus it will be seen that when the plate 37 is in the position shown in Fig. 3 it will engage the detent 39 which is locked against inward movement by bearing against the face of the slide way 28 until the pin and slide plate is moved to the left to permit the detent 39 to engage into the notch 40 thereby releasing its engagement with the plate 37 permitting the slide plate 30 to continue its movement while the slide plate 31 is at rest.

The width of the plate 37 is made of a size to lock the detent within the notch 40 during its continued left hand movement which will correspondingly lock the slide plate 31 in its shifted position.

The plate 37 to release the detent must move to such a position as will bring the notch 38 in alinement with the notch 40 at which time the gear 24 has been intermeshed with the gear 14, and the gears 15 and 16 are then moved to the right by the collar 42 carrying with it the arm 41 and slide plate 31.

41 represents a depending arm fixed to the slide plate 31 adapted to engage against one side of the gear 16 to move said gear to the left in such movement of the slide plate 31.

The return movement of gears 15 and 16 into intermeshing position with gear 18 is accomplished as follows:—42 represents a collar adjacent to gear 25 and carried by the sleeve 19 and of such diameter as to engage the side of gear 16. Thus it will be seen that when gear 25 is slid into mesh with gear 16 it will carry with it gears 15 and 16 in the movement of sleeve 19 to the right. By this construction of shifting the sliding gears by one lever it will be seen that the proper intermesh of the respective gears of the system can only be obtained for a given ratio of speed, thereby preventing the gears during a change from one speed to another to be accidentally left in a position of improper intermesh which might cause breakage or undue wear of the gears or idle drive upon the gears not required for a given ratio of speed.

The following changes of speed can be affected in the system shown in the drawings:—First, assume that the gears are in the position as shown in the drawings, Fig. 1, with the tumbler gear 6 intermeshed with any one of the gears of the cone, power is transmitted from shaft 13 to shaft 17, through the elongated gear 14 on shaft 13 and through the train of gears 24, 25, 16 and 15 loose on their respective shafts and driving gear 18 keyed upon shaft 17. Second, assume that the sleeve 19 has been moved to bring gear 24 to the opposite end of the elongated gear 14 which movement will likewise shift gear 15 to the left out of engagement with gear 18. Motion will be imparted to shaft 17 when the gears are in this position through elongated gear 14, gear 24, driving sleeve 19, said movement having brought the sleeve 19 into clutching engagement with the sleeve 22 keyed to the shaft 17 thereby effecting a second drive. Third, assume that the sleeve 19 is shifted to a further left position during which movement the sleeve 22 will be retained into clutching engagement with the sleeve 19, and gear 23 will intermesh with gear 12 of the cone. Thus motion will be imparted from gear 12 to gear 23, and thence through the particular clutching between the sleeves 19 and 22, and driving shaft 17.

Having described my invention, I claim:—

1. In a variable speed device, first and second shafts, a series of loose and fixed gears upon said first shaft, said loose gears being slidably mounted, a series of loose gears slidably mounted on said second shaft adapted to be simultaneously shifted and brought into selected engagement with the respective gears upon the first shaft, a gear fixed upon said second shaft adapted to be intermeshed with one of said sliding gears on the first shaft, clutching means carried by said second shaft for clutching said sliding gears to said shaft, and means for simultaneously shifting said sliding gears on both shafts, substantially as described.

2. In a variable speed device, first and second shafts, a series of loose and fixed gears upon said first shaft, said loose gears being slidably mounted, a series of loose gears slidably mounted on said second shaft adapted to be simultaneously shifted and brought into selected engagement with the respective gears upon the first shaft, a gear fixed upon said second shaft adapted to be intermeshed with one of said sliding gears on the first shaft, clutching means carried by said second shaft for clutching said sliding gears to said shaft, means for simultaneously shifting said sliding gears on both shafts, and means for locking the sliding gears on said first shaft in their released position, substantially as described.

3. In a variable speed device, first and second shafts, a series of loose and fixed gears upon said first shaft, said loose gears being slidably mounted, a series of loose gears slidably mounted on said second shaft adapted to be simultaneously shifted and brought into selected engagement with the respective gears upon the first shaft, a gear fixed upon said second shaft adapted to be intermeshed with one of said sliding gears on the first shaft, and means for clutching said sliding gears to their shaft after the sliding gear on the first shaft is thrown out of intermesh with its respective gear on the second shaft, substantially as described.

4. In a variable speed device, first and second shafts, a series of loose and fixed gears upon said first shaft, said loose gears being slidably mounted, a series of loose gears slidably mounted on said second shaft adapted to be simultaneously shifted and brought into selected engagement with the respective gears upon the first shaft, a gear fixed upon said second shaft adapted to be intermeshed with one of said sliding gears on the first shaft, means for clutching said sliding gears to their shaft after the sliding gear on the first shaft is thrown out of intermesh with its respective gear on the second shaft, and means for locking said sliding gears on said first shaft in their released position, substantially as described.

5. In a variable speed device, first and second shafts, a series of loose and fixed gears upon said first shaft, said loose gears being slidably mounted, a series of loose gears slidably mounted on said second shaft adapted to be simultaneously shifted and brought into selected engagement with the respective gears upon the first shaft, a gear fixed upon said second shaft adapted to be intermeshed with one of said sliding gears on the first shaft, clutching means carried by said second shaft for clutching said sliding gears to said shaft, and means for shifting said sliding gears positively on one shaft and intermittently on the other, substantially as described.

In testimony whereof, I have hereunto set my hand.

LOUIS THIEL.

Witnesses:
OLIVER B. KAISER,
LEO O'DONNELL.